July 31, 1945. F. G. FOLBERTH ET AL 2,380,511
WINDSHIELD WIPER MOTOR
Filed Oct. 1, 1943 5 Sheets-Sheet 1

INVENTORS
FREDERICK G. FOLBERTH
& WILLIAM M. FOLBERTH
BY
Bosworth & Sessions
ATTORNEYS

July 31, 1945.  F. G. FOLBERTH ET AL  2,380,511
WINDSHIELD WIPER MOTOR
Filed Oct. 1, 1943  5 Sheets-Sheet 2

INVENTORS
FREDERICK G. FOLBERTH
& WILLIAM M. FOLBERTH
BY
Bosworth + Sessions
ATTORNEYS

July 31, 1945.  F. G. FOLBERTH ET AL  2,380,511
WINDSHIELD WIPER MOTOR
Filed Oct. 1, 1943  5 Sheets-Sheet 5

INVENTORS
FREDERICK G. FOLBERTH
& WILLIAM M. FOLBERTH
BY
Bosworth & Sessions
ATTORNEYS Patented July 31, 1945

2,380,511

UNITED STATES PATENT OFFICE 2,380,511

WINDSHIELD WIPER MOTOR

Frederick G. Folberth and William M. Folberth,
Cleveland, Ohio

Application October 1, 1943, Serial No. 504,542

10 Claims. (Cl. 121—158)

This invention relates to fluid pressure actuated motors and more particularly to an improved hydraulic motor especially designed for operating windshield cleaners and the like. This application may be considered in some respects as an improvement upon the subject matter disclosed in our prior applications, Serial No. 382,040, filed March 6, 1941 (now Patent No. 2,343,656), Serial No. 412,142, filed September 24, 1941, and Serial No. 426,942, filed January 16, 1942 (now Patent No. 2,353,022). In some respects the present invention may be considered as an improvement on the windshield cleaner motors described in our aforesaid applications.

A general object of the present invention is to provide a light, compact, powerful, quiet and foolproof fluid motor especially adapted for operating windshield cleaners of the oscillating squeegee type, although it is to be understood that the motors may be utilized for other purposes.

Another object is to provide a simple and effective valve mechanism for controlling the flow of fluid to the main drive piston of a fluid motor. Another object is to provide such a valve mechanism embodying a main valve and a pilot valve and wherein the main piston, pilot valve and main valve operate in sequence and wherein each of these elements must substantially complete its movement before the movement of the next element can start, thus eliminating any possibility of the valve stopping on dead center and insuring reliable operation of the motor. Another object is the provision of a valve mechanism for such a motor in which the reciprocating parts are cushioned at the ends of their strokes to insure quiet operation and to eliminate undue wear on the parts. Another object is to provide a simple and effective mechanism to make possible the initial starting of the motor if the valves should be set on dead center during assembly.

Other objects of our invention are the provision of a motor particularly adapted for operating airplane windshield wipers by means of oil or other liquid under pressure; the provision of an hydraulic motor in which only a small amount of fluid is required to operate the valves; the provision of such a motor having extremely low leakage if for any reason the drive shaft of the motor is stopped or stalled as might possibly occur if the squeegee blade were frozen to the windshield of the airplane; and the provision of a windshield cleaner motor which can be manufactured at reasonable cost and which, by reason of its light and compact construction, is economical of materials. Other objects and advantages of our invention will become apparent from the following description of a preferred form thereof, reference being made to the accompanying drawings. The essential characteristics are summarized in the claims.

Referring to the drawings, Figures 17 to 22, inclusive, diagrammatically illustrate the positions of the main operating piston and the valves during a complete cycle of operations while

Figure 1:
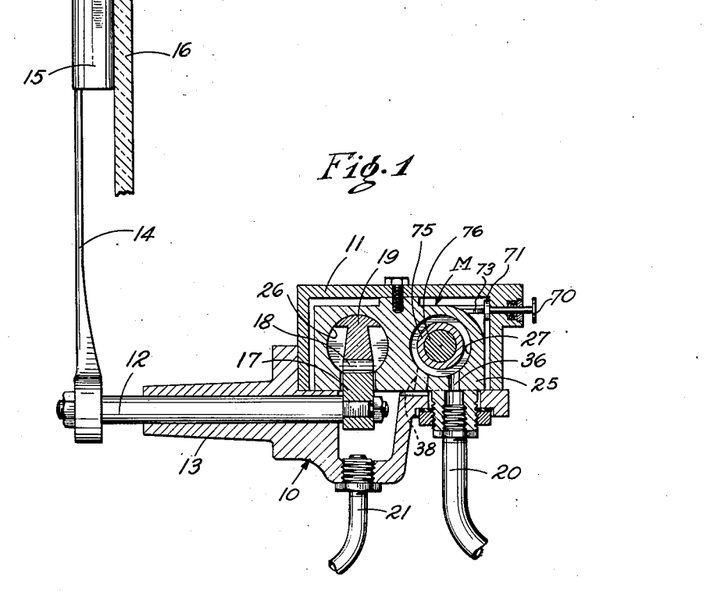
Figure 1 is a vertical section through a windshield wiper motor made according to our invention and shown within a suitable case as it may be installed in an airplane, the section being taken along line 1—1 of Figure 2.
Figure 2:
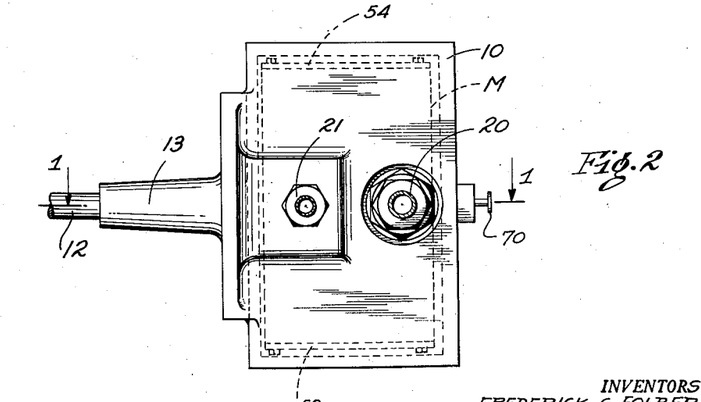
Figure 2 is a bottom view of the assembly shown in Figure 1.

Referring to Figures 1 and 2 of the drawings, a windshield cleaner motor embodying a preferred form of our invention is indicated in general at M, being disposed within a suitable casing composed of a casting 10 secured to the under side of the motor, and a hollow stamping or casting 11 enclosing the upper portion of the motor. The operating shaft 12 for the cleaner arm mechanism projects through the supporting boss 13, and may be provided with any suitable arm 14 for supporting a conventional squeegee blade 15 in contact with the windshield indicated diagrammatically at 16. The shaft is provided at its inner end with a segmental gear 17 which engages rack teeth 18 formed in the central part of the main drive piston 19 of the motor. While we prefer to employ a piston of the type shown, it will be understood that a vane type piston may be employed in a segmental chamber and that such construction is within the meaning of the terms "piston" and "cylinder" as used in a broad sense herein. Actuating fluid such as oil under pressure may be supplied to the motor through the inlet conduit 20 and associated fitting, and exhausted through the conduit 21. The fluid may be supplied from any suitable source of pressure. In ordinary airplane installations, oil is supplied by an engine-driven pump and the flow of fluid under pressure to the windshield cleaner is controlled by any suitable valve within convenient reach of the pilot.

Referring now to Figures 3 to 9, inclusive, the fluid motor itself comprises a casting 25 having two main parallel bores 26 and 27 therein constituting the actuating or power chamber and the valve chamber, respectively. Preferably, these chambers are in the form of cylinders as shown, but it is to be understood that chambers of other shapes may be employed, and that such chambers are within the scope of our invention and are included within the term "cylinder" as used hereafter in the specification and claims. The central portion of the cylinder 26 is formed with a lateral opening as at 28 to expose the rack 18 of the main drive piston 19, the piston being provided with a reduced central portion 29 and opposed piston heads 30 and 31. Fluid under pressure is supplied to the opposite ends of the cylinder 26 to actuate the piston through the end passageways 32 and 33, see Figures 6 and 7, the piston preferably being constructed as described in detail in our Patent No. 2,353,022, with recessed heads and notches to admit fluid into the cylinders adjacent the heads when the piston is at the ends of its stroke. Passageways which communicate with the cylinder adjacent the piston heads 30 and 31 at the ends of the respective strokes of the piston are also provided, these being shown at 34 and 35 in Figures 3 and 8. The flow of fluid into and out of the passages 32 and 33 is controlled by the valve mechanism described in detail below, while the pilot valve is operated by fluid under pressure flowing from the main cylinder through the passageways 34 and 35.

Figure 3:
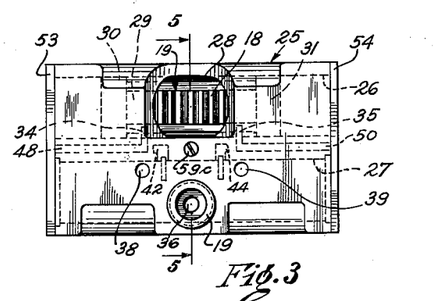
Figure 3 is the bottom view of the motor.
Figures 4, 6:
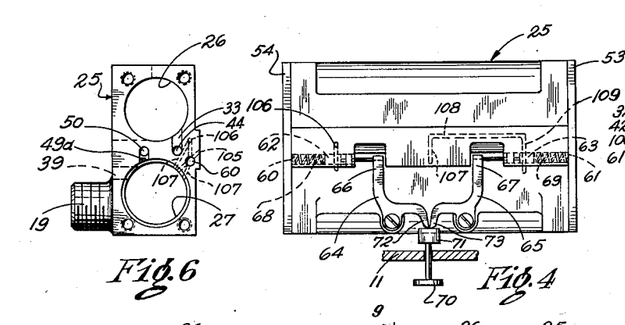
Figure 4 is a top view of the motor casting with the starting valve mechanism and the end plates in place.
Figure 6 illustrates the left hand end of the casting of Figure 4, the end plate being removed.
Figure 7:
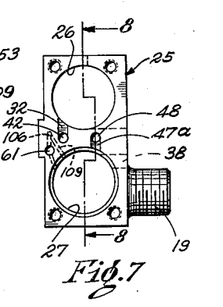
Figure 7 is a similar view showing the right hand end of the casting of Figure 4.
Figures 8, 10:
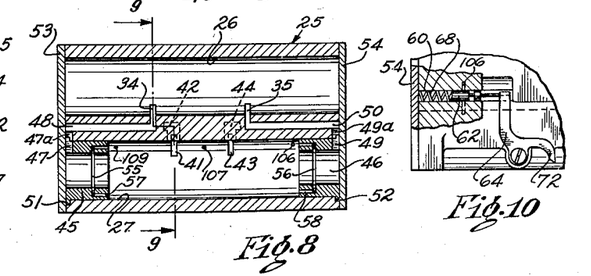
Figure 8 is a section through the motor casting with the valve bushings in place and the end plates secured thereto, the section being taken as indicated by line 8—8 of Figure 7.
Figure 10 is a detail showing one of the valves provided for initial starting of the motor.
Figure 9:
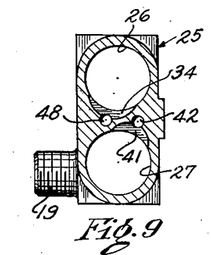
Figure 9 is a transverse section as indicated by the line 9—9 of Figure 8.
Figure 11:
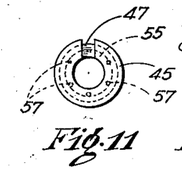
Figures 11 and 12 are details illustrating one of the valve bushings.
Figure 12:
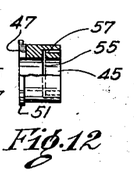

The actuating fluid is supplied through the conduit 20 and passageway 36 into the center of the valve cylinder 27 and fluid is exhausted from the valve cylinder 27 through the exhaust ports 38 and 39, see Figures 3, 6 and 7. The exhaust from these ports is collected by the casting 10 and conducted to the exhaust conduit 21. Communication between the intake passage 32 and the valve cylinder 27 is afforded through the groove 41 and drilled passageway 42 which extends into communication with the passageway 32. Groove 43 communicates with the drilled passageway 44 which intersects the passageway 33 in the same manner.

In order to insure the proper sequential operation of the main and pilot valves, as described in detail hereinafter, valve bushings 45 and 46 are disposed within the ends of the valve cylinder 27. Bushing 45 is provided with a radial slot 47 at its end which provides communication through slot 47a in the casting with the drilled passageway 48 leading to the slot 34 (see Figure 8), thus affording communication between the piston cylinder and the valve cylinder at this point. Similarly, bushing 46 is provided with a radial slot 49 leading through slot 49a to the drilled passageway 50 which communicates with the slot 35. The bushings are provided with flanges 51 and 52, respectively, which fit into counterbores in the ends of the valve cylinder and thus are held securely in position when the end plates 53 and 54 are secured to the cylinder. The plates 53 and 54, which may be secured to the casting by suitable screws complete the passageway afforded by slots 32 and 33 leading to the main cylinder, as well as those afforded by slots 47, 47a and 49, 49a. The bushings 45 and 46 are also provided with annular grooves 55 and 56, respectively, which communicate with a series of drilled passageways 57 and 58, respectively, for purposes to be described in detail below.

Figure 5:
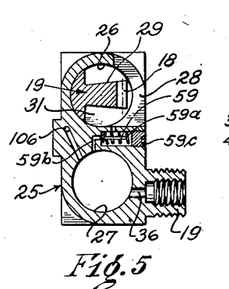
Figure 5 is a section taken along line 5—5 of Figure 3.

To prevent the building up of excessive fluid pressures in the motor, a pressure relief valve 59 is provided (see Figure 5). Pressures exceeding a predetermined limit will open the valve against the action of spring 59a, permitting fluid to flow through the passages 59b from the center of the valve cylinder to the open central zone 28 of the bore 26. The pressure may be varied by adjusting the spring by means of screw 59c.

The cylinder casting is also provided with bores 60 and 61 which receive the starting valves 62 and 63, these being actuated through levers 64 and 65 pivotally mounted on the casting and having ends 66 and 67 disposed in recesses in the casting and engaging the ends of the valve members 62 and 63 to move them outwardly against the resistance of springs 68 and 69. The levers and the valves may be actuated by a push button 70 extending through the housing 11 and having an enlarged end 71 engaging the ends 72 and 73 of the levers 64 and 65, respectively, so that when the button is pushed inwardly, the valves will be moved in opposite directions by the ends 66 and 67 of the levers.

Figure 13:
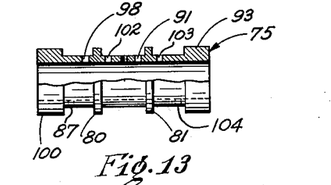
Figure 13 is a detail, partly in section, showing the main valve which controls the flow of fluid to and from the main operating cylinder.
Figure 14:
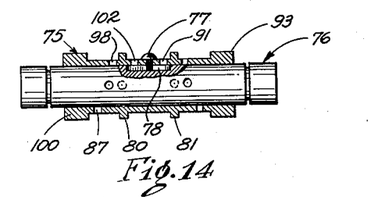
Figure 14 illustrates the assembly of main valve and pilot valve, parts being broken away.
Figure 15:
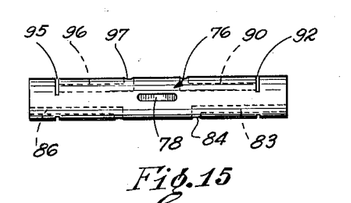
Figure 15 is a view of the pilot valve, the valve being rotated 90° from the position shown in Figure 14.
Figure 16:
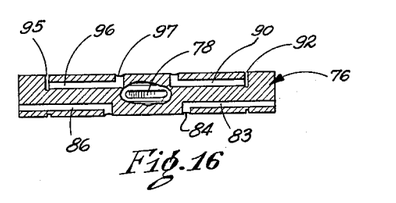
Figure 16 is a sectional view of the pilot valve showing the oil passages and slot for preventing relative rotation between the main valve and the pilot valve.

The valve mechanism for controlling the flow of fluid between the inlet and exhaust and the ends of the operating cylinder includes a main valve 75 shown in Figure 13 and a pilot valve 76 as illustrated in Figures 15 and 16. The pilot valve preferably is of greater length than, and operates within the main valve as shown in Figure 14 and reciprocates with respect thereto but is prevented from turning with respect to the main valve by the screw 77 which extends into the slot 78. The main and pilot valves are disposed within the valve cylinder 27, with the ends of the pilot valve extending within the valve bushings 45 and 46.

Referring now to Figures 17 to 23, inclusive, the operation of the device will be described. In these figures, which are sections generally similar to Figure 8, but showing the valve and piston in place, several of the fluid passageways are illustrated diagrammatically, and for the sake of convenience and clarity are shown in full lines even though they may not be in the same plane. Also for convenience and clarity some passageways are indicated as being within the end plates 53 and 54, although these passageways are preferably provided as shown in the other figures of the drawings by cutting grooves or slots in the end faces of the main casting 25. The reference characters applied to the passageways in these figures are the same as those applied to the same passageways in the detail drawings showing the various valve parts and the main casting.

Figure 17:
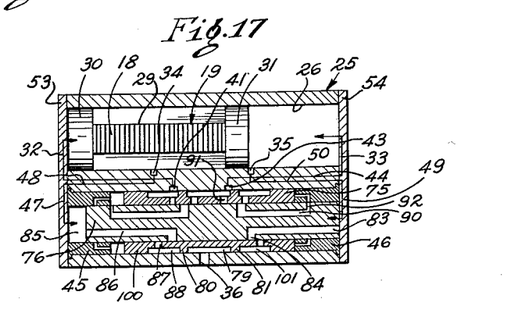

In Figure 17, the mechanism is shown in one of its extreme positions, the piston 19 being at its extreme position to the left, while the main valve 75 and the pilot valve 76 are at their extreme positions to the right. At this stage of the cycle of operations, oil or other fluid under pressure entering the inlet port 36 flows around the annular space 79 between the flanges 80 and 81 of the main valve, through the slot 43 and the passageways 44 and 33 into the right-hand end of the main cylinder 26. Inasmuch as no further movement of the piston 19 is possible and as the piston head 31 has cleared the port 35, fluid flowing into the right hand end of the main cylinder can escape only through the port 35, the drilled passageway 50, the slots 49a and the radial passageway 49 in the bushing 46 to the right-hand end of the pilot valve 76. Inasmuch as the passage 83 of the pilot valve is closed at the port 84 by the main valve, the fluid cannot escape and pressure acts to move the pilot valve to the left. While the pilot valve is moving to the left, fluid in the space 85 at the left-hand end of the pilot valve can escape through slots 47, 47a and the passageway 48 leading to the port 34 which has been uncovered by the reduced section 29 of the main piston as shown in Figure 3. After a slight movement of the pilot valve to the left, the fluid in the space 85 may also be exhausted through the passageway 86 which leads through the port 87 of the main valve into the annular space 88 around the main valve which is always in communication with the exhaust port 38. (See Figures 3 and 7.)

Figure 18:
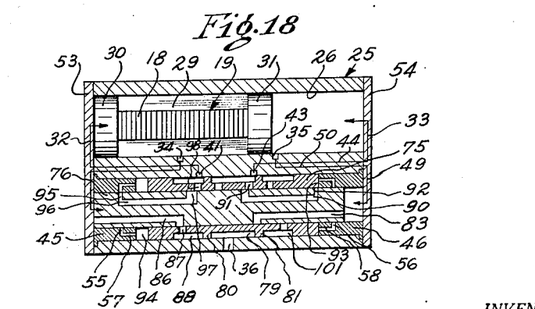
Figure 19:
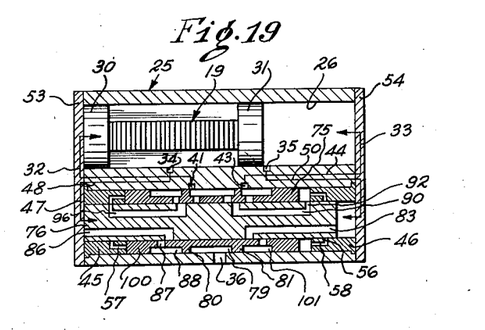

A short movement of the pilot valve to the left places the passageway 90 in communication with the hole 91 through the main valve and thus the passageway 90 is in communication with the annular space 79 and hence with the supply of fluid under pressure. However, during the major portion of the stroke of the pilot valve, no fluid can flow through the passageway 90 for the slot 92 communicating therewith is blocked by the bushing 46 until the pilot valve reaches substantially its extreme left position as shown in Figure 18. Thus the bushing prevents operation of the main valve until the pilot valve has substantially completed its stroke to the left. When this position is reached fluid under pressure can flow from the annular space 79 through the port 91 in the main valve, the passage 90 and slot 92 in between the end of the bushing 46 and the end face 93 of the main valve member. In this position, the axial passages 58 and annular groove 56 of the bushing are closed by the pilot valve so that the fluid pressure cannot escape, but acts against the end face of the main valve which makes a close sliding fit within the valve cylinder, and thus moves the main valve to the left. During this motion the fluid in the space 94 at the left hand end of the main valve is exhausted through the drilled passageway 57 and the annular groove 55 of the bushing 45, into the slot 95, through the passageway 96 and port 97 of the pilot valve and thence through the port 98 into the annular space 88 between the end portion 100 and the flange 80 of the main valve, and thence to the exhaust port 38.

When the main valve member is moved to the left as far as it can go (see Figure 19) the annular rings 80 and 81 are positioned immediately to the left of slots 41 and 43, respectively. Thus the annular space 79 is placed in communication with the port or groove 41, permitting the actuating fluid to flow from inlet 36 through the annular space, the port 41 and the passageways 42 and 32, thus admitting pressure to the left hand end of the main piston against the piston head 30 and forcing the piston to the right. During the movement of the piston to the right, fluid ahead of the piston head 31 is exhausted through the passageways 33 and 44 and port 43 into the annular space 101 and thence to the exhaust port 39 (see Figures 3 and 6), thus completing one-half cycle of operation or one stroke of the main piston.

Figure 20:
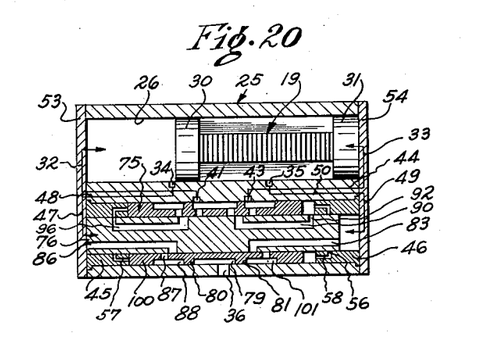
Figure 21:
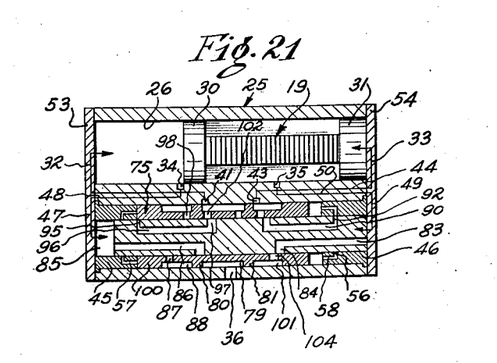

When the main piston reaches the right-hand end of the cylinder as shown in Figure 20, the piston head 30 uncovers the port 34 so that fluid admitted to the left-hand chamber of the cylinder may flow out through the port 34, the passageways 48, 47a and 47 to act upon the left-hand end of the pilot valve urging it to the right. The operation is just as described with respect to the movement of the valves to the left, except that the direction of movement is reversed, the arrangement being such that when the pilot valve has completed its stroke to the right as shown in Figure 21, fluid may flow from the annular space 79, which is always in communication with the inlet 36, through the port 102, the port 97, the passageway 96 and the slot 95, to act against the end 100 of the main valve, thus moving the main valve to the right and placing the valves in the position shown in Figure 22.

As the pilot and main valve members are moved to the right as described immediately above, the exhaust of fluid from the right-hand end of the valve cylinder is accomplished in the same manner as previously described with reference to the movement of these parts to the left. That is, the fluid ahead of the pilot valve is exhausted through the passageways 49, 49a and 50 through the slot 35, and after a slight amount of movement may be exhausted through the passageway 83, port 84 and port 104 into the annular space 101 which communicates with the exhaust port 39. Similarly the fluid ahead of the main valve in its movement to the right may be exhausted through the openings 58 and groove 56, groove 92, passage 90 and port 103 into the annular space 101 and thence to the exhaust port 39.

Figure 22:
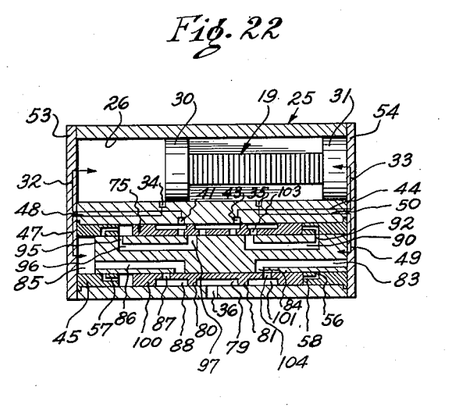

When the valves are in the position shown in Figure 22 fluid under pressure may be admitted from the annular space 79 through the port 43 and passageways 44 and 33 to the right-hand end of the main cylinder, thus applying fluid pressure against the piston head 31 to move the piston to the left to the position shown in Figure 1, and thereby completing a cycle of operation. The cycle will be repeated so long as fluid is supplied under sufficient pressure to overcome the load, the speed depending upon the pressure and load.

It is to be particularly noted that in the motor itself there are only three moving parts, the piston, the main valve and the pilot valve. No springs, cams or snap-over devices are required, and each of the parts is moved in sequence with the movement of each part necessarily completed before the succeeding part can start its movement. Furthermore, the arrangement is such that the fluid tends to lock the valve members against movement except at the proper times. Thus when pressure is applied to the main piston with the parts in the position shown in Figure 22, for example, fluid is trapped at the left-hand end of the pilot valve, for the initial movement of the main piston closes the port 34, and thus the pilot valve is held in its extreme right-hand position until the port is opened. There is no possibility of pressure being applied to the left-hand end of the pilot valve until the piston head 31 clears the port 35 at the end of its stroke. Similarly, fluid is trapped in the space at the left-hand end of the main valve, for the passageways in the bushing 47 are closed by the pilot valve and the port 97 is blocked by the main valve. Thus, the main valve is locked in its extreme right-hand position by fluid during the movement of the piston to the left and cannot be moved until the piston clears the port 35 admitting fluid under pressure to the end of the pilot valve to move it to the left. Likewise, as explained in detail above, no movement of the main valve can take place until the pilot valve has completed its motion and the piston cannot start its movement in the reverse direction until the main valve has completed its movement so that the annular rings 80 and 81 clear the ports 41 and 43.

Figure 23:
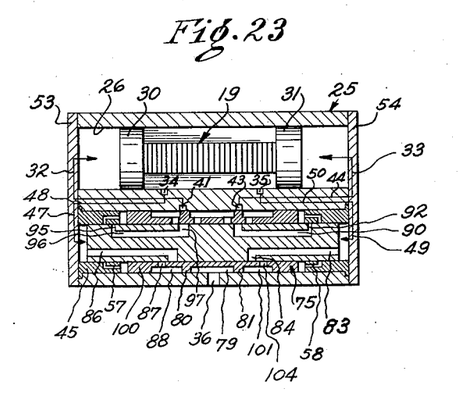
Figure 23 illustrates the piston and valve mechanisms in neutral or deadcenter position.

It is this sequential operation of the parts, which is obtained without springs, cams or snap-over devices, that makes it impossible for the motor to become stalled in dead center position. A careful study of the valve mechanism will show that the main valve can be placed in dead center position so that the rings 80 and 81 close both ports 41 and 43, and in this position no fluid under pressure can be admitted to the main actuating cylinder. However, as soon as fluid under pressure is admitted to the annular space 79, the main valve will be moved away from its dead center position unless the pilot valve also is substantially in dead center position as shown in Figure 23. If the main and pilot valves were set as shown in Figure 23, the motor would not start when the fluid under pressure was turned on, but the valves cannot reach this position in ordinary operation, for as long as the pilot valve is in center position, the main valve cannot move away from one of its extreme positions, and at any time that the main valve is moving from one of its extreme positions to the other through the dead center position, the pilot valve must be at one or the other of its extreme positions. Thus, the main valve and the pilot valve never move simultaneously and never pass through dead center or neutral position at the same time. Thus the motor cannot be stopped with the valves in dead center position, and this result is accomplished with the valves operated solely by fluid pressure and without the need of springs, cams or snap-over devices of any sort, thereby simplifying the construction of the device and insuring reliable operation with the use of a minimum amount of fluid.

While the dead center position of the valves can never be reached after the motor has once been placed in operation, it is possible that the valves might be placed in this position in initial assembly of the device or if the device were drained of oil, vibration might as a very remote possibility place the two valves in their precise central positions and prevent operation of the motor. To take care of this extremely remote contingency, we have provided the emergency or initial starting valves 62 and 63 which are operable by the push button 70 as described above. These valves function only when the push button is pressed inwardly and merely to permit the exhaust of fluid from one end of the main valve and the admission of fluid under pressure to the other end of the main valve, thus moving the main valve from its central position shown in Figure 23 and permitting fluid under pressure to flow into the main actuating cylinder. To accomplish this we provide a passageway 106 extending from the inner surface of the valve cylinder to the exterior of the casting, this passage being controlled by the valve member 62. When the push button 71 is actuated, the valve member 62 is moved to the left, see Figures 4 and 10, opening the passage 106 and thus permitting the fluid to exhaust from the adjacent end of the main valve. Simultaneously the valve 63 is operated to open the communication through passageways 107, 108 and 109 which extend from the annular space 79 to the other end of the main valve member. Thus when the push button is actuated, fluid will be immediately admitted to the one end of the main valve and the valve immediately moved to the right (Figure 23), starting the cycle of operations by admitting fluid to the main pressure cylinder.

From the foregoing description of a preferred form of our invention, it will be seen that we have provided a relatively simple, compact, light and powerful fluid motor. Because of its lightness and its compactness, our motor is particularly adapted for the operation of windshield wipers on airplanes. The operation of the motor is extremely quiet for the movement of the valve members is cushioned at the ends of their strokes by the oil film trapped between the end faces of the valve members and the end plates, in the case of the pilot valve, and the valve bushings in the case of the main valve. Because of the absence of any springs or snap-over devices, only a small movement of the valve members is required. Thus the valves are very quick acting at the ends of the strokes of the main piston and require a very small amount of oil or other fluid for their operation. The arrangement also is such that there never can be excessive leakage of oil or other operating fluid even though the motor be stalled, for example by ice, with the actuating fluid turned on. The efficiency of the motor is demonstrated by the fact that a motor having over-all dimensions of about 3″ by 1⅞″ by 1″ and weighing less than one and one-quarter pounds can furnish ample power to operate an airplane windshield wiper at speeds ranging from extremely slow operation up to 500 complete cycles per minute under an oil pressure of 400 pounds per square inch, for example. In a device capable of such performance, the stroke of the cylinder is only ⅞″, and the valve mechanism moves only about ⅛″. As the valve cylinder and drive cylinder are both only ⅝″ in diameter, the economy in use of oil will be readily apparent.

The efficiency and speed of operation of our motor is due in large part to the arrangement of the valve mechanism, while the sequential operation of the main piston, pilot valve and main valve makes it impossible for the motor to be stalled or stopped on dead center. Because of the simple and rugged construction of our motors, windshield wipers embodying our motors can be manufactured at relatively low cost and without requiring undue amounts of material.

In the foregoing application, we have described a preferred embodiment of our invention in considerable detail. Various changes and modifications may be made in the preferred form described herein without departing from the spirit and scope of our invention. Therefore, it is to be understood that our patent is not limited to the preferred form described herein or in any manner other than by the scope of the appended claims.

We claim:

1. In a liquid operated motor, a main drive cylinder, a piston operable therein, a valve cylinder, means for conducting fluid between said valve cylinder and said main cylinder, inlet means for supplying liquid under pressure to said valve cylinder and means for permitting the exhaust of liquid from said valve cylinder, and valve means disposed within said valve cylinder for controlling the flow of liquid between said valve cylinder and said main cylinder, said valve means including an outer main valve and an inner pilot valve, said outer main valve controlling the flow of liquid to said main cylinder and being reciprocable within said valve cylinder by liquid pressure acting against the ends thereof, said pilot valve being reciprocable within said main valve member by the pressure of liquid flowing from said main operating cylinder and controlling the flow of liquid under pressure to reciprocate said main valve, there being fluid passageways leading from said main cylinder to said valve cylinder to supply liquid to actuate said pilot valve only after said main piston has substantially completed a stroke, there being passages to permit the exhaust of liquid ahead of the pilot valve in its movement in either direction and said pilot valve having passageways therein adapted to supply liquid under pressure to move said main valve from one of its extreme positions to the other only after said pilot valve member has substantially completed its motion relative to said valve cylinder.

2. In a liquid operated motor, a main drive cylinder, a piston operable therein, a valve cylinder, means for conducting liquid between said valve cylinder and said main cylinder, an inlet for admitting liquid under pressure to said valve cylinder, exhaust ports for permitting the exhaust from said liquid from said valve cylinder, and valve means disposed within said valve cylinder for controlling the flow of liquid to and from said main cylinder, said valve means including a main valve and a pilot valve, said main valve controlling the flow of fluid to said main cylinder and being reciprocable within said valve cylinder by liquid pressure, said pilot valve being reciprocable by the pressure of liquid flowing from said main cylinder and controlling the flow of liquid under pressure to reciprocate said main valve, there being passages to permit the exhaust of liquid ahead of the pilot valve in its movement in either direction, said pilot valve having passageways therein adapted to supply liquid under pressure to move said main valve from one of its extreme positions to the other only after said pilot valve has substantially completed its motion relative to said valve cylinder.

3. In a liquid operated motor, a main drive cylinder, a piston operable therein, a valve cylinder, means for conducting liquid between said valve cylinder and said main cylinder, an inlet for admitting liquid under pressure to said valve cylinder, exhaust ports for permitting the exhaust of said liquid from said valve cylinder, and valve means disposed within said valve cylinder for controlling the flow of liquid to and from said main cylinder, said valve means including a main valve and a pilot valve, said main valve controlling the flow of fluid to said main cylinder and being reciprocable within said valve cylinder by liquid pressure, said pilot valve being reciprocable by the pressure of liquid flowing from said main cylinder at the extreme ends of the stroke of the main piston and controlling the flow of liquid under pressure to reciprocate said main valve, there being passages to permit the exhaust of liquid ahead of said main and pilot valves during reciprocation of said valves in either direction, said pilot valve and main valve having passageways therein adapted to supply liquid under pressure directly from said inlet to move said main valve from one of its extreme positions to the other only after said pilot valve has substantially completed its motion relative to said valve cylinder.

4. In a fluid operated motor, a main drive cylinder, a piston operable therein, a valve cylinder, means for conducting fluid between said valve cylinder and said main cylinder, an inlet for admitting fluid under pressure to said valve cylinder and means for permitting the exhaust of fluid from said cylinder, and valve means disposed within said valve cylinder for controlling the flow of fluid between said valve cylinder and said main cylinder, said valve means including an outer main valve and an inner pilot valve, said outer main valve controlling the flow of fluid to said main cylinder and being reciprocable within said valve cylinder by fluid pressure, said pilot valve being reciprocable within said main valve and controlling the flow of fluid under pressure to reciprocate said main valve, said main valve and said pilot valve having neutral positions wherein said main valve shuts off communication between said main cylinder and said valve cylinder, and said pilot valve shuts off fluid to reciprocate said main valve, said main valve having a central portion providing an annular space within said valve cylinder in constant communication with said inlet, and manually operated valve means adapted to connect said annular space with the valve cylinder at one end of said main valve and to open communication between the other end of said valve cylinder and atmosphere, whereby operation of said valve means permits starting of the fluid motor even though both the main valve and pilot valve may be in neutral position.

5. In a fluid operated motor, a main drive cylinder, a piston operable therein, a valve cylinder, means for conducting fluid between said valve cylinder and said main cylinder, an inlet for admitting fluid under pressure to said valve cylinder and means for permitting the exhaust of fluid from said valve cylinder, and valve means disposed within said valve cylinder for controlling the flow of fluid between said valve cylinder and said main cylinder, said valve means including a main valve and a pilot valve, said main valve controlling the flow of fluid to said main cylinder and being reciprocable within said valve cylinder by fluid pressure, said pilot valve being reciprocable and controlling the flow of fluid under pressure to reciprocate said main valve, said main valve and said pilot valve having neutral positions wherein said main valve shuts off communication between said main cylinder and said valve cylinder, and said pilot valve shuts off fluid to reciprocate said main valve member, and manually operated valve means adapted to supply fluid under pressure to move said main valve from its neutral position to one of its extreme positions, thereby to open communication between said inlet and said main drive cylinder.

6. In a fluid operated motor, a main drive cylinder, a piston operable therein, a valve cylinder, means for conducting fluid between said valve cylinder and said main cylinder, an inlet for admitting fluid under pressure to said valve cylinder and means for permitting the exhaust of fluid from said valve cylinder, and valve means disposed within said valve cylinder for controlling the flow of fluid between said valve cylinder and said main cylinder, said valve means including an outer main valve, an inner pilot valve of greater length than said main valve, and valve bushings disposed at opposite ends of the valve cylinder and having end faces serving as stops for said main valve and internal bores adapted to receive the ends of said pilot valve, said main valve controlling the flow of fluid to said main cylinder and being reciprocable within said valve cylinder by fluid pressure acting against the ends thereof, said pilot valve being reciprocable within said main valve and controlling the flow of fluid under pressure to reciprocate said main valve, said pilot valve having passageways therein adapted to supply fluid under pressure to reciprocate said main valve, said valve bushings preventing the flow of such fluid until the pilot valve reaches substantially the end of its stroke, said valve bushings having passageways constantly open to the ends off said main valve to permit the exhaust of fluid ahead of said main valve during its reciprocation, said passageways being controlled by said pilot valve to permit such exhaust only after said pilot valve has substantially completed its stroke and having radial passageways to admit actuating fluid to reciprocate said pilot valve.

7. In a fluid operated motor, a main drive cylinder, a piston operable therein, a valve cylinder, means for conducting fluid between said valve cylinder and said main cylinder, an inlet for admitting fluid under pressure to said valve cylinder and means for permitting the exhaust of fluid from said cylinder, and valve means disposed within said valve cylinder for controlling the flow of fluid between said valve cylinder and said main cylinder, said valve means including an outer main valve, an inner pilot valve of greater length than said main valve, and valve bushings disposed at opposite ends of the valve cylinder and having end faces serving as stops for said main valve and internal bores adapted to receive the ends of said pilot valve, said main valve controlling the flow of fluid to said main cylinder and being reciprocable within said valve cylinder by fluid pressure acting against the ends thereof, said pilot valve being reciprocable within said main valve and controlling the flow of fluid under pressure to reciprocate said main valve, said pilot valve having passageways therein adapted to supply fluid under pressure to reciprocate said main valve, said valve bushings preventing the flow of such fluid until the pilot valve reaches substantially the end of its stroke and having axially extending passageways controlled by said pilot valve to permit the exhaust of fluid ahead of said main valve during its reciprocation.

8. In a fluid operated motor, a main drive cylinder, a piston operable therein, a valve cylinder, means for conducting fluid between said valve cylinder and said main cylinder, an inlet for admitting fluid under pressure to said valve cylinder and means for permitting the exhaust of fluid from said cylinder, and valve means disposed within said valve cylinder for controlling the flow of fluid between said valve cylinder and said main cylinder, said valve means including a main valve, a pilot valve of greater length than said main valve, and valve bushings disposed at opposite ends of the valve cylinder and having end faces serving as stops for said main valve, said main valve controlling the flow of fluid to said main cylinder and being reciprocable within said valve cylinder by fluid pressure acting against the ends thereof, said pilot valve being reciprocable within said main valve and controlling the flow of fluid under pressure to reciprocate said main valve, said valve bushings having axial passageways in constant communication with the ends of the main valve to permit the exhaust of fluid ahead of said main valve during its reciprocation.

9. In a liquid operated motor, a main drive cylinder, a piston operable therein, a valve cylinder, means for conducting liquid between said valve cylinder and said main cylinder, an inlet for admitting liquid under pressure to said valve cylinder and means for permitting the exhaust of liquid from said cylinder, and valve means disposed within said valve cylinder for controlling the flow of liquid between said valve cylinder and said main cylinder, said valve means including a main valve, a pilot valve, and valve bushings disposed at opposite ends of the valve cylinder, said main valve controlling the flow of liquid to said main cylinder and being reciprocable within said valve cylinder by fluid pressure, said pilot valve being reciprocable within said main valve and controlling the flow of liquid under pressure to reciprocate said main valve, said valve bushings having passageways to permit the exhaust of liquid ahead of said main valve during its reciprocation and thereby to permit the main valve to move from one of its extreme positions, said pilot valve controlling the flow of liquid through said passageways to permit such movement only when the pilot valve is at the extreme opposite end of its stroke.

10. In a fluid operated motor, a main drive cylinder, a piston operable therein, a valve cylinder, means for conducting fluid between said valve cylinder and said main cylinder, an inlet for admitting fluid under pressure to said valve cylinder and means for permitting the exhaust of fluid from said cylinder, and valve means disposed within said valve cylinder for controlling the flow of fluid between said valve cylinder and said main cylinder, said valve means including a main valve, a pilot valve, and valve bushings disposed at opposite ends of the valve cylinder, said main valve controlling the flow of fluid to said main cylinder and being reciprocable within said valve cylinder by fluid pressure, said pilot valve being reciprocable within said main valve and controlling the flow of fluid under pressure to reciprocate said main valve, said valve bushings blocking the flow of fluid to reciprocate said main valve except when said pilot valve has substantially completed its stroke and permitting the exhaust of fluid ahead of said main valve throughout the stroke of the main valve and only when said pilot valve substantially has completed its stroke.

FREDERICK G. FOLBERTH.
WILLIAM M. FOLBERTH.